May 8, 1962     C. S. ASH     3,033,499
AIRCRAFT HANDLING RESIDENTIAL BUILDING
Filed June 18, 1959     2 Sheets-Sheet 1
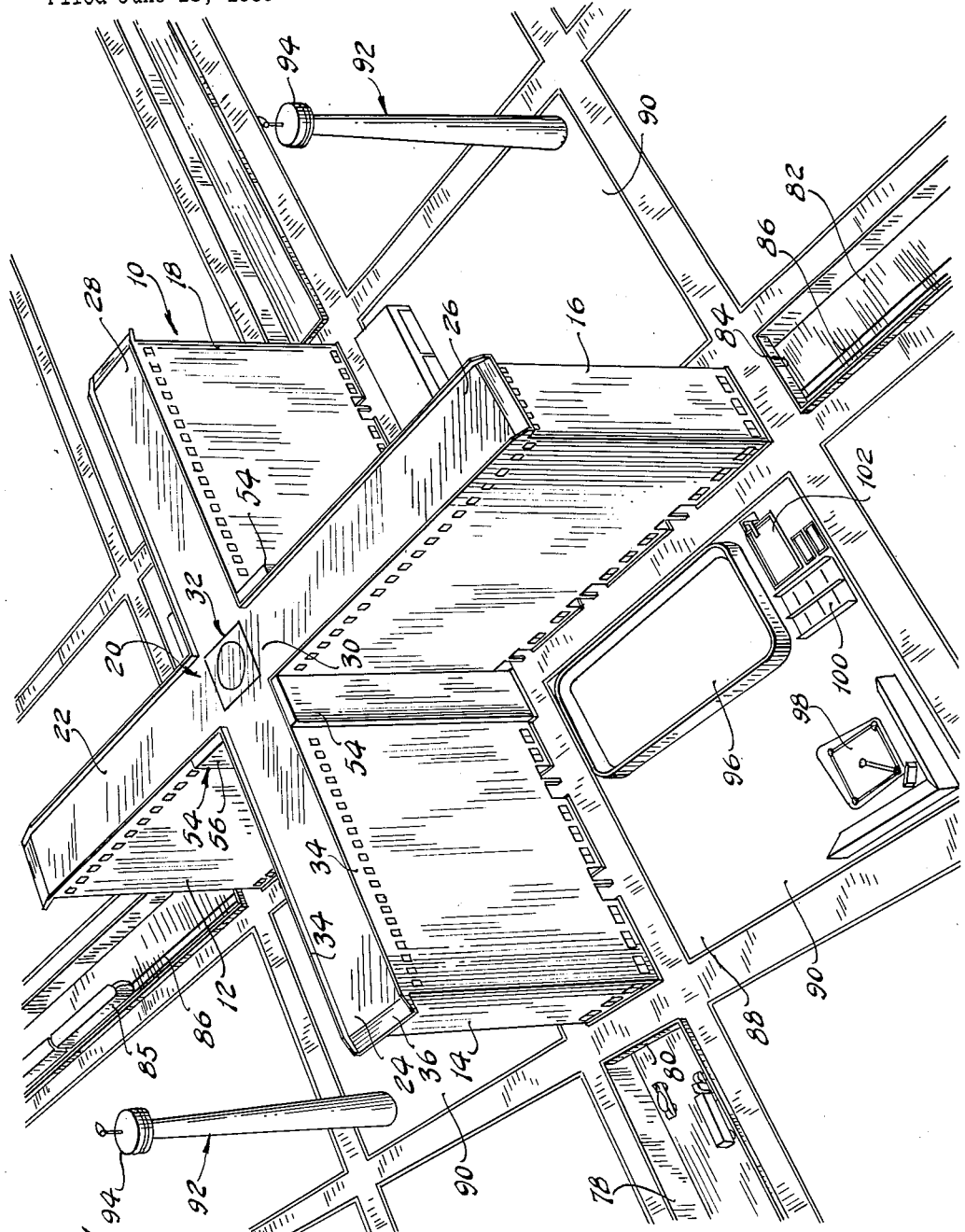
INVENTOR.
CHARLES S. ASH
BY Barthel & Bugbee
ATTORNEYS

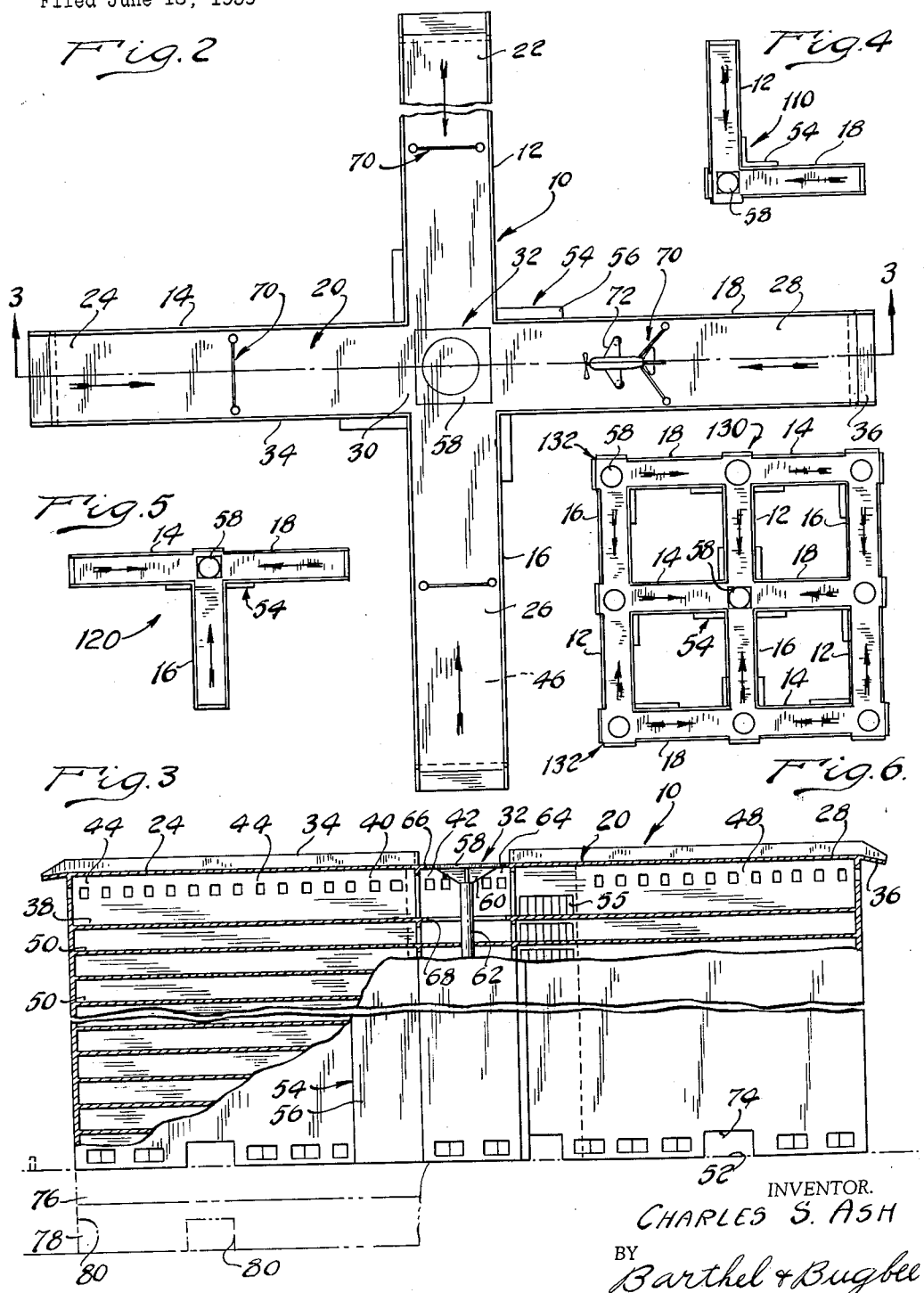

United States Patent Office 3,033,499
Patented May 8, 1962

3,033,499
AIRCRAFT HANDLING RESIDENTIAL BUILDING
Charles S. Ash, 2220 Wixom Road, Milford, Mich.
Filed June 18, 1959, Ser. No. 821,143
2 Claims. (Cl. 244—114)

This invention relates to building structures and, in particular, to residential buildings such as apartment houses.

One object of this invention is to provide a generally self-sufficient multi-story residential building having an aircraft landing roof, with elevator facilities for transferring the aircraft between the landing roof and an aircraft service and storage room or floor on the level immediately below the landing roof.

Another object is to provide a generally self-sufficient multi-story residential building of the foregoing character which is cross-shaped in plan, thereby enabling aircraft to land or take off in four principal directions.

Another object is to provide a generally self-sufficient multi-story residential building as set forth in the preceding objects which has the aircraft elevator located at the meeting point of the arms of the cross, so as to facilitate transferring the aircraft to and from the service floor immediately below the flight roof or landing roof, and enabling such aircraft to be most easily moved into or out of any desired one of the four wings thus provided for the aircraft service floor.

Another object is to provide a generally self-sufficient multi-story residential building as set forth in the preceding objects wherein the multiple floors between the aircraft service floor and the lowermost floors are allotted to residential apartments, the lowermost floors being allotted to service facilities such as stores, recreational and athletic establishments, religious centers, theaters and other services for the tenants of the building, whereby to provide within the building facilities rendering it generally self-sufficient and in the main independent of outside facilities.

Another object is to provide a generally self-sufficient multi-story residential building, as set forth in the object immediately preceding wherein garage facilities for the tenants' automobiles are provided in the basement levels of the building so that tenants may land their aircraft on the roof, transfer them to the aircraft service floor below it, take a passenger elevator to the basement garage, with or without a visit to their apartments, or vice versa.

Another object is to provide a generally self-sufficient multi-story residential building, as set forth above, wherein public transportation facilities are also provided by means of a subway into or adjacent the basement of the building.

Other objects and davantages of the invention will become apparent during the course of the following description of the accompanying drawings, wherein:

FIGURE 1 is an aerial perspective view of a self-sufficient residential building, according to one form of the invention, showing the aircraft landing roof and the approaches to the ground and basement floor of the building;

FIGURE 2 is a top plan view of the building shown in FIGURE 1; and

FIGURE 3 is a central vertical section partly in side elevation of the building shown in FIGURES 1 and 2, with the section taken along the line 3—3 in FIGURE 2;

FIGURE 4 is a top plan view of an L-shaped building according to a modification of the invention;

FIGURE 5 is a top plan view of a T-shaped building, according to another modification of the invention; and FIGURE 6 is a top plan view of a gridiron-shaped bulding according to a furhter modification of the invention.

Referring to the drawings in detail, FIGURES 1, 2 and 3 show a self-sufficient residential building, generally designated 10, of generally cross-shaped form provided with wings 12, 14, 16 and 18 covered by a cross-shaped aircraft landing roof 20 with portions or branches 22, 24, 26 and 28 radiating outward from a meeting or crossing area junction portion 30 containing an aircraft elevator, generally designated 32. Each of the branches 22, 24, 26 and 28 is provided along its longitudinal edges with a parapet 34 for the purpose of preventing aircraft from sliding off the landing roof 20 during takeoff or landing operations, and likewise to provide safety for passengers alighting from or taking off in the aircraft. Likewise provided at the end of each branch 22, 24, 26 and 28 is a downwardly-inclined end portion 36 for facilitating takeoff or landing of the aircraft in its transition from the landing roof 20 to an airborne condition and vice versa.

Located immediately below the landing roof 20 is an aircraft service and storage floor 38 (FIGURE 3) providing an aircraft service and storage space or compartment 40 divided into four wings or bays 42, 44, 46 and 48 respectively. Below the aircraft srevice and storage floor 38 are multiple residential floors 50 which are divided up into apartments but which in the drawings are shown free from partition walls in order to avoid complicating the disclosure. The residential floors 50 are provided with conventional heating and plumbing equipment (not shown), such features being customarily provided in residential buildings and consequently their details being beyond the scope of the present invention. Extending between the aircraft service and storage floor 38 and the ground or street floor 52 by way of the residential floors 50 are conventional passenger elevator units 54 consisting of the usual elevator shaft structures 56 equipped with conventional passenger elevators (not shown) and enabling the rapid and easy transfer of passengers between the various floors of the building 10. These elevator units 54 are preferably located in the inner corners of the building 10 adjacent the meeting or crossing area 30 and thus adjacent the aircraft elevator 32, and have doors 55 giving access thereto.

The aircraft elevator 32 preferably consists of a rectangular platform 58 resting upon a supporting head 60 which in turn is connected to the top of an elevator plunger 62. The latter is optionally moved upward and downward by conventional hydraulic motors but may also use conventional electric motors for the same purpose, as is well-known and understood in the elevator art. The aircraft elevator shaft 64 containing the platform 58 extends from the aircraft landing roof 20 to the aircraft service and storage floor 38, both of these having openings 66 and 68 respectively (FIGURE 3) receiving the platform 58 of the aircraft elevator 32. Suitable conventional retractible guard rails (not shown) are provided around the openings 66 and 68 for safety purposes. Aircraft arresting or retarding devices, generally designated 70, are provided on the landing roof 20 in each of the branches 22, 24, 26 and 28 to bring a landing aircraft 72 to a halt in a rapid and efficient manner. Such aircraft landing retardation devices are also known to those skilled in the aircraft industry and their details form no part of the present invention, as various conventional types may be employed for this purpose. The aircraft service and storage compartment 40 is provided with the necessary equipment for maintenance, repair and service of the aircraft received therein from the elevator 32, such as machine tools, testing instruments, lubrication equipment and the like.

The ground or street floor 52 of the building 20 is provided with stores, shops, and recreational facilities and is also provided with doors 74 for the entrance and exit of service and passenger vehicles. The building 20 (FIGURE 3) is provided with a basement 78 affording automobile garage and service facilities and a basement 76 in which is disposed the usual service and maintenance equipment of the building 20, as well as the heating and ventilating apparatus, electric switchboards and other necessary equipment for this and analogous purposes. Access to the garage space 78 may be by means of a subway or sunken drive 79 through entrances 80 (FIGURE 1), the subways 78 also serving for the reception of buses, trucks and the like. A transverse subway 82 with entrances 84 into the building 20 below the ground level thereof also serves for the transit and reception of public service vehicles, such as subway trains 85 on tracks 86.

The land area 88 upon which the building 20 is erected is preferably square in outline and provides square subsidiary areas or lots 90 located between the various building wings or arms 12, 14, 16 and 18. One or two of these corner lots 90 may be provided with control and meteorological towers, generally designated 92, with the usual control stations 94 at the top thereof for regulating the arrival and departure of aircraft to and from the landing roof 20. One or more of the other lots 90 is optionally devoted to recreational equipment, such as playing fields 96 and 98 and tennis courts 100, and others to parking facilities for tenants' automobiles.

The use of a building 20 is believed to be generally self-evident from the foregoing description of its construction and equipment. As regards its aircraft handling equipment, however, it may be said that an aircraft 72 approaches the building 10 under instructions from the operator in the control station 94 of the control tower 92, who directs him to land upon one of the branches 22, 24, 26 or 28, according to the wind and weather conditions. Accordingly, the pilot lands the aircraft 72 where it is immediately brought into contact with the arresting or retarding devices 70 which retard the landing speed of the aircraft, aided by its own brakes, and brings it quickly to a halt. The aircraft 72 is then taxied or hauled by a conventional tractor to the platform 58 of the aircraft elevator 32, whereupon the plunger 62 is operated to cause the platform 58 to descend to the aircraft service and storage floor 38, with the platform 58 flush with the opening 68 therein. The aircraft 72 is then hauled off the platform 58 into one of the bays 42, 44, 46 or 48 of the aircraft service and storage space 40 while its passengers descend either to their living compartments on the residential floors 50 by way of the passenger elevators 54, reached through the access doors 55 thereof, or to the street floor 52 or basement 76, depending upon their desires for the particular surface transportation which they intend to use.

In this manner, the residents of the building 20 may use their own aircraft, and store and service it in the building, or they may be transported through the air by suitable commercial air transport, such as by helicopters or small aircraft. At the same time, their surface vehicles, such as automobiles, may also be serviced in the building and, to some extent, stored therein.

The L-shaped building, generally designated 110, shown in FIGURE 4 is generally similar in construction and operation to the cross-shaped building 10 of FIGURES 1, 2 and 3 except that the wings 14 and 16 have been omitted. Accordingly, corresponding parts in FIGURE 4 have been numbered with the same reference numerals as in FIGURES 1, 2 and 3.

The T-shaped building, generally designated 120, shown in FIGURE 5, also is generally similar in construction and operation to the cross-shaped building 10 of FIGURES 1, 2 and 3, except that the wing 12 has been omitted. Accordingly, corresponding parts in FIGURE 5 have been numbered with the same reference numerals as in FIGURES 1, 2 and 3.

The gridiron-shaped building, generally designated 130, shown in FIGURE 6 is also generally similar in construction and operation to the cross-shaped building 10 of FIGURES 1, 2 and 3, except that four L-shaped connecting structures 132 have been added to interconnect the adjacent ends of the cross-shaped structure 10 forming the core of the building 130. Accordingly, these L-shaped structures 132 have been numbered with the same reference numerals as those of the corresponding wings of the building 10 in FIGURE 2, and the composite parts also bear corresponding reference numerals.

Reference is therefore made to the foregoing description of the construction and operation of the building 10 of FIGURES 1, 2 and 3, in order to avoid duplication of description.

What I claim is:

1. An airplane-handling residential building, comprising a multi-story multi-apartment building structure having a junction portion and a plurality of wings radiating outwardly therefrom in mutually perpendicular directions, said building structure having a roof extending over said wings, said roof having unobstructed substantially flat stationary airplane landing strips on the uppermost portion of said building structure, said landing strips being open to the sky substantially throughout their entire lengths and radiating outwardly from said junction portion in mutually perpendicular directions, said building structure having an airplane service compartment in the upper ends of said wings immediately beneath said landing strips, said airplane service compartment having an airplane service floor therein; an airplane elevator shaft mounted in the upper end of said junction portion of said building structure, and an airplane elevator mounted in said elevator shaft, said airplane elevator including a vertically-movable elevator platform and mechanism for moving said platform upward and downward between landing strips and said airplane service floor.

2. An airplane handling residential building, according to claim 1, wherein said building structure wings within said service compartment have entrances at their inner ends opening into said junction portion and onto said airplane elevator in said airplane elevator shaft.

References Cited in the file of this patent

UNITED STATES PATENTS

| | | |
|---|---|---|
| 1,814,985 | Florido | July 14, 1931 |
| 1,843,640 | Jackson et al. | Feb. 2, 1932 |

OTHER REFERENCES

Science and Invention, Aug. 1931.

Science and Invention, page 796, Jan. 1926, No. 9, title: "Air Transportation Station of 1950."

Aero Digest, pages 56–58, May 1, 1944, title: "Hangar Roof Runway Terminal Airport."